United States Patent
Huang et al.

(10) Patent No.: US 9,942,827 B2
(45) Date of Patent: Apr. 10, 2018

(54) DYNAMIC CROSSBAND LINK METHOD AND WIRELESS EXTENDER

(71) Applicant: U-MEDIA Communications, Inc., Hsinchu (TW)

(72) Inventors: Chia-Ching Huang, Penghu County (TW); Yi-Wen Liu, Hsinchu (TW)

(73) Assignee: U-MEDIA Communications, Inc., Hsinchu (TW)

( * ) Notice: Subject to any disclaimer, the term of this patent is extended or adjusted under 35 U.S.C. 154(b) by 100 days.

(21) Appl. No.: 15/072,331

(22) Filed: Mar. 16, 2016

(65) Prior Publication Data

US 2016/0277996 A1 Sep. 22, 2016

(30) Foreign Application Priority Data

Mar. 20, 2015 (TW) .............................. 104109079 A (51) Int. Cl.
| | |
|---|---|
| *G06F 11/00* | (2006.01) |
| *H04J 1/16* | (2006.01) |
| *H04L 1/00* | (2006.01) |
| *H04L 12/26* | (2006.01) |
| *H04W 40/12* | (2009.01) |
| *H04W 24/08* | (2009.01) |

(52) U.S. Cl.
CPC ............ *H04W 40/12* (2013.01); *H04W 24/08* (2013.01)

(58) Field of Classification Search
CPC .............................. H04W 40/12; H04W 24/08
USPC .......................... 370/328, 329, 330, 252, 254
See application file for complete search history.

(56) References Cited

U.S. PATENT DOCUMENTS

| | | | | |
|---|---|---|---|---|
| 7,299,005 | B1 | 11/2007 | Yarkosky | |
| 9,509,480 | B2 * | 11/2016 | Wild | H04B 7/024 |
| 2007/0237094 | A1 | 10/2007 | Bi | |
| 2013/0100865 | A1 * | 4/2013 | Baghel | H04L 5/001 370/280 |
| 2015/0071239 | A1 * | 3/2015 | Zhang | H04L 1/0006 370/329 |
| 2015/0229456 | A1 * | 8/2015 | Wild | H04B 7/024 375/295 |

FOREIGN PATENT DOCUMENTS

WO           2012010017 A1      1/2012

* cited by examiner

*Primary Examiner* — Chuong T Ho
(74) *Attorney, Agent, or Firm* — Winston Hsu (57) ABSTRACT

A dynamic crossband link method includes utilizing a local forwarding module to receive packet data from a client device via a first frequency band, obtaining a first communication quality indicator corresponding to a first uplink forwarding module and a second communication quality indicator corresponding to a second uplink forwarding module, and determining to transmit the packet data to a wireless access device via the first uplink forwarding module or via the second uplink forwarding module according to the first communication quality indicator and the second communication quality indicator.

21 Claims, 4 Drawing Sheets

DYNAMIC CROSSBAND LINK METHOD AND WIRELESS EXTENDER

BACKGROUND OF THE INVENTION

1. Field of the Invention

The present invention relates to a dynamic crossband link method and wireless extender, and more particularly, to a dynamic crossband link method capable of dynamically adjusting data uplink path, and a wireless extender thereof.

2. Description of the Prior Art

With the rapid advancement of wireless network technologies and the convenience and portability of wireless networks, there is a growing demand wireless communication network applications. Generally, in a wireless communication network, environmental effects cause wireless signals to suffer unknown phase shift and amplitude attenuation during transmission, thus resulting in interference in signals received by a receiving terminal and signal distortion and affecting signal transmission efficiency. As such, for extending the area of coverage of an existing wireless communication network, a wireless extender or a wireless repeater is used and placed between a wireless access device and a client device for forwarding packet data.

On the other hand, a multiband wireless extender may allow data to be transmitted over multiple frequency bands for providing a wide range of transmission. However, the conventional multiband wireless extender usually transmits packet data using respective frequency band independently. In more detail, the conventional multiband wireless extender receives packet data from the client device via a first frequency band and transmits the received packet data to the wireless access device via the first frequency. Similarly, the conventional multiband wireless extender receives packet data from the client device via a second frequency band and transmits the received packet data to the wireless access device via the second frequency. As such, since the conventional multiband extender receives the packet data from the client device using a specific frequency band, the conventional multiband extender is unable to transmit packet data to the external wireless access device over the same frequency band, thus reducing the transmission efficiency.

SUMMARY OF THE INVENTION

It is therefore an objective of the present invention to provide a dynamic crossband link method and a wireless extender capable of dynamically adjusting data uplink path, to solve the problems in the prior art.

The present invention discloses a dynamic crossband link method, comprising utilizing a local forwarding module to receive packet data from a client device via a first frequency band; obtaining a first communication quality indicator corresponding to a first uplink forwarding module and a second communication quality indicator corresponding to a second uplink forwarding module; and determining to transmit the packet data to a wireless access device via the first uplink forwarding module or via the second uplink forwarding module according to the first communication quality indicator and the second communication quality indicator.

The present invention further discloses a wireless extender, applied between a wireless access device and a client device, comprising a local forwarding module, for receiving packet data from the client device via a first frequency band; a first uplink forwarding module, for communicating with the wireless access device via the first frequency band; a second uplink forwarding module, for communicating with the wireless access device via a second frequency band; and a connection path selection module, comprising: a processing unit, for obtaining a first communication quality indicator corresponding to the first uplink forwarding module and a second communication quality indicator corresponding to the second uplink forwarding module; and a determination unit, for determining to transmit the packet data to the wireless access device via the first uplink forwarding module or via the second uplink forwarding module according to the first communication quality indicator and the second communication quality indicator.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
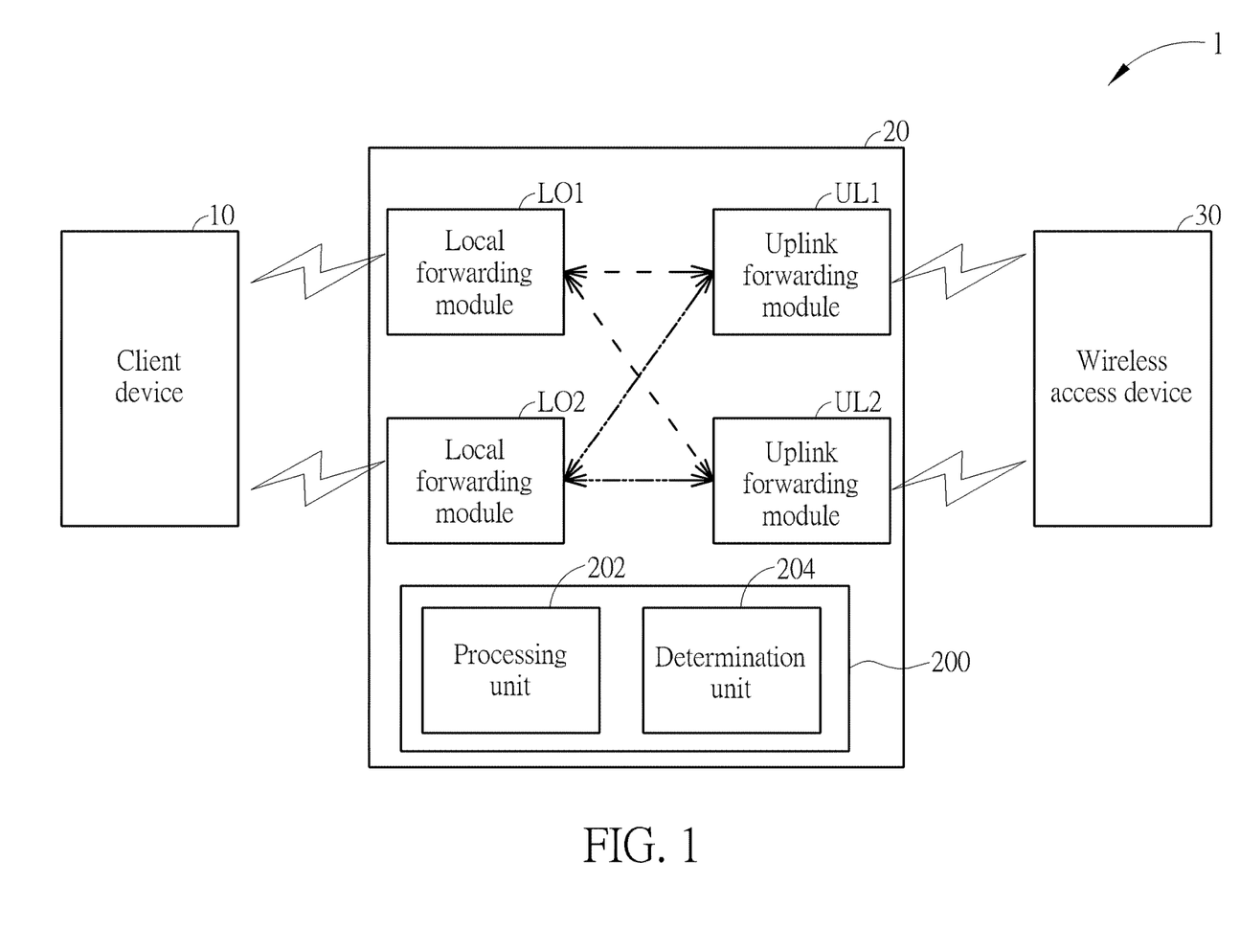
FIG. 1 is a schematic diagram of a communication system according to an embodiment of the present invention.

Please refer to FIG. 1, which is a schematic diagram of a communication system 1 according to an embodiment of the present invention. The communication system 1 includes a client device 10, a wireless extender 20 and a wireless access device 30. The wireless extender 20 is applied between the client device 10 and the wireless access device 30 for forwarding data packets. The wireless access device 30 is utilized for connecting to another network. The wireless access device 30 may include, but is not limited to, a wireless router or a wireless access point (AP). Moreover, the wireless extender 20 includes a connection path selection module 200, local forwarding modules LO1 and LO2, and uplink forwarding modules UL1 and UL2. The local forwarding module LO1 is utilized for communicating with the client device 10 via a first frequency band. The local forwarding module LO2 is utilized for communicating with the client device 10 via a second frequency band. The uplink forwarding module UL1 is utilized for communicating with the wireless access device 30 via the first frequency band. The uplink forwarding module UL2 is utilized for communicating with the wireless access device 30 via the second frequency band. The connection path selection module 200 includes a processing unit 202 and a determination unit 204. The processing unit 202 is utilized for obtaining a first communication quality indicator corresponding to the uplink forwarding module UL1 and a second communication quality indicator corresponding to the uplink forwarding module UL2. The determination unit 204 is utilized for determining to transmit the packet data received from the client device 10 to the wireless access device 30 via the uplink forwarding module UL1 or via the uplink forwarding module UL2 according to the first communication quality indicator and the second communication quality indicator. In other words, the connection path selection module 200 of the wireless extender 20 can dynamically adjust transmission paths for transmitting the received packet data to the wireless access device 30 according to communication quality indicators, thereby improving the transmission efficiency.

Figure 2:
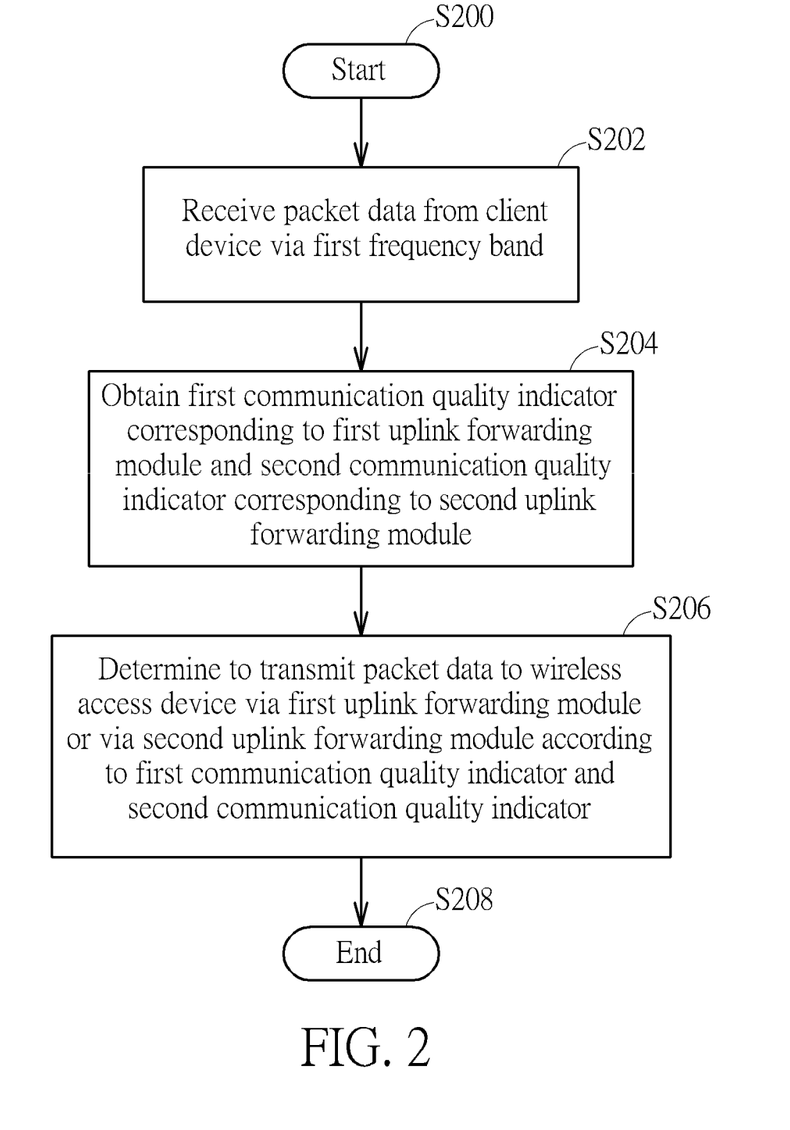
FIG. 2 is a flow diagram of a procedure according to an embodiment of the present invention.

For an illustration of the operations of selecting connection paths of the wireless extender 20, please refer to FIG. 2. FIG. 2 is a flow diagram of a procedure 20 according to an embodiment of the present invention. The flowchart in FIG. 2 mainly corresponds to the operations on the wireless extender 20 shown in FIG. 1. The procedure 20 includes the following steps:

Step S200: Start.

Step S202: Receive packet data from client device via first frequency band.

Step S204: Obtain first communication quality indicator corresponding to first uplink forwarding module and second communication quality indicator corresponding to second uplink forwarding module.

Step S206: Determine to transmit packet data to wireless access device via first uplink forwarding module or via second uplink forwarding module according to first communication quality indicator and second communication quality indicator.

Step S208: End.

According to the procedure 20, the wireless extender 20 of the invention can provide packet forwarding functions in the communication system 1. In the wireless extender 20, the local forwarding modules LO1 and LO2 can be utilized to transmit and receive packet data to and from the client device 10 and the uplink forwarding modules UL1 and UL2 can be utilized to transmit the received packet data to the wireless access device 30. In more detail, the wireless extender 20 can dynamically adjust uplink transmission paths for transmitting the received packet data to the wireless access device 30 according to related communication quality indicators so as to improve the transmission efficiency.

In Step S202, the local forwarding module LO1 or the local forwarding module LO2 receives packet data from the client device 10.

In Step S204, the processing unit 202 obtains a first communication quality indicator corresponding to the uplink forwarding module UL1 and a second communication quality indicator corresponding to the uplink forwarding module UL2. The first communication quality indicator and the second communication quality indicator may respectively include at least one of a data rate, a packet error rate (PER), a wireless link quality, received signal strength indication (RSSI), a resend rate, transmit queued time and a signal to noise ratio (SNR), and this should not be a limitation of the present invention.

In Step S206, the determination unit 204 determines that the uplink forwarding module UL1 or the uplink forwarding module UL2 transmits the received packet data to the wireless access device 30 according to the first communication quality indicator and the second communication quality indicator.

In an embodiment, the processing unit 202 obtains a first data rate corresponding to the uplink forwarding module UL1 and a second data rate corresponding to the uplink forwarding module UL2. The first data rate is the data rate between the uplink forwarding module UL1 and the wireless access device 30. The second data rate is the data rate between the uplink forwarding module UL2 and the wireless access device 30. Moreover, the determination unit 204 can determine that the uplink forwarding module UL1 or the uplink forwarding module UL2 transmits the packet data received from the client device 10 to the wireless access device 30 according to the first data rate and the second data rate. For example, when the first data rate is greater than a threshold value, the determination unit 204 may determine that the uplink forwarding module UL1 transmits the packet data received from the client device 10 to the wireless access device 30. When the first data rate is smaller than or equal to the threshold value, the determination unit 204 may determine that the uplink forwarding module UL2 transmits the packet data received from the client device 10 to the wireless access device 30. In other words, the invention can dynamically choose the best uplink transmission path for transmitting the received packet data to the wireless access device 30 according to related communication quality indicators, thus improving the transmission efficiency.

In an embodiment, when the local forwarding module LO1 receives packet data from the client device 10 via the first frequency band (e.g. Step S202). The processing unit 202 obtains a first data rate and a first packet error rate corresponding to the uplink forwarding module UL1, and obtains a second data rate and a second packet error rate corresponding to the uplink forwarding module UL2. Further, the processing unit 202 obtains a first local data rate and a first local packet error rate corresponding to the local forwarding module LO1 (e.g. Step S204). The first data rate and the first packet error rate are respectively the data rate and the packet error rate between the uplink forwarding module UL1 and the wireless access device 30. The second data rate and the second packet error rate are respectively the data rate and the packet error rate between the uplink forwarding module UL2 and the wireless access device 30. The first local data rate and the first local packet error rate are respectively the data rate and the packet error rate between the local forwarding module LO1 and the client device 10.

Moreover, regarding the packet data received by the local forwarding module LO1 via the first frequency band, the processing unit 202 calculates a straight throughput and a crossband throughput according to related communication quality indicators obtained at Step S204 for the following transmission path selection (e.g. Step S206). In more detail, since the local forwarding module LO1 receives packet data from the client device 10 and the uplink forwarding module UL1 and the local forwarding module LO1 both operate at the first frequency band (i.e. the uplink forwarding module UL1 operates in the same frequency band utilized by the local forwarding module for communication with the client device), the processing unit 202 can calculate the straight throughput according to the first data rate corresponding to the uplink forwarding module UL1 and the first local data rate corresponding to the local forwarding module LO1.

Since the local forwarding module LO1 operates at the first frequency band and the uplink forwarding module UL2 operates at the second frequency band (i.e. the uplink forwarding module UL2 operate in different frequency bands), the processing unit 202 can calculate the crossband throughput according to the second data rate corresponding to the uplink forwarding module UL2 and the first local data rate corresponding to the local forwarding module LO1.

The following further elaborates the embodiments of calculating the straight throughput and the crossband throughput. For example, the processing unit 202 calculates a first uplink throughput according to the first data rate and the first packet error rate corresponding to the uplink forwarding module UL1. The processing unit 202 calculates a second uplink throughput according to the second data rate and the second packet error rate corresponding to the uplink forwarding module UL2. The processing unit 202 calculates a first local throughput according to the first local data rate and the first local packet error rate corresponding to the local forwarding module LO1. The processing unit 202 calculates a second local throughput according to the second local data rate and the second local packet error rate corresponding to the local forwarding module LO2. The first uplink throughput, the second uplink throughput, the first local throughput and the second local throughput may be calculated by the processing unit 202 according to the following equation:

$$TP_i = R_i \times (1 - PER_i) \quad (1)$$

where i=1, 2, 3 and 4; $TP_1$, $R_1$, $PER_1$ represent, respectively, the first uplink throughput, the first data rate and the first packet error rate corresponding to the uplink forwarding module UL1; $TP_2$, $R_2$, $PER_2$ represent, respectively, the second uplink throughput, the second data rate and the second packet error rate corresponding to the uplink forwarding module UL2; $TP_3$, $R_3$, $PER_3$ represent, respectively, the first local throughput, the first local data rate and the first local packet error rate corresponding to the local forwarding module LO1; and $TP_4$, $R_4$, $PER_4$ represent, respectively, the second local throughput, the second local data rate and the second local packet error rate corresponding to the local forwarding module LO2.

Since the local forwarding module LO1 receives packet data from the client device 10, and the uplink forwarding module UL1 and the local forwarding module LO1 operate at the first frequency band, the processing unit 202 can calculate the straight throughput according to the first uplink throughput and the first local throughput. The straight throughput for the wireless client 10 may be calculated by the processing unit 202 according to the following equation:

$$TP\_S = TP_1 \times TP_3 / (TP_1 + TP_3) \quad (2)$$

where TP_S represents the straight throughput for the wireless client 10, $TP_1$ represents the first uplink throughput corresponding to the uplink forwarding module UL1, and $TP_3$ represents the first local throughput corresponding to the local forwarding module LO1.

Since the local forwarding module LO1 receives packet data from the client device 10, and the uplink forwarding module UL2 and the local forwarding module LO1 operate at different frequency bands, the processing unit 202 can calculate the crossband throughput corresponding to the client device 10 according to the second uplink throughput and the first local throughput. The processing unit 202 compares the second uplink throughput with the first local throughput and selects a minimum of the second uplink throughput and the first local throughput as the crossband throughput corresponding to the client device 10. The crossband throughput corresponding to the client device 10 may be calculated by the processing unit 202 according to the following equation:

$$TP\_C = \min(TP_2, TP_3) \quad (3)$$

where TP_C represents the crossband throughput corresponding to the client device 10, $TP_2$ represents the second uplink throughput corresponding to the uplink forwarding module UL2, and $TP_3$ represents the first local throughput corresponding to the local forwarding module LO1.

Moreover, after straight throughput and the crossband throughput corresponding to for the wireless client 10 are calculated by the processing unit 202, the determination unit 204 can determine that the packet data is transmitted to the wireless access device 30 via the uplink forwarding module UL1 or via the uplink forwarding module UL2 according to the straight throughput and the crossband throughput. For example, the processing unit 202 compares the calculated straight throughput with the calculated crossband throughput. When the straight throughput is greater than the crossband throughput, the determination unit 204 determines that the packet data is transmitted to the wireless access device 30 via the uplink forwarding module UL1 (i.e. straight forwarding mode). In such a situation, the local forwarding module LO1 can receive packet data from the client device 10 via the first frequency band and transmit the received packet data to the uplink forwarding module UL1. Furthermore, the uplink forwarding module UL1 can transmit the packet data to the wireless access device 30 via the first frequency band. When the straight throughput is smaller than or equal to the crossband throughput, the determination unit 204 determines that the packet data is transmitted to the wireless access device 30 via the uplink forwarding module UL2 (i.e. crossband forwarding mode). In such a situation, the local forwarding module LO1 can receive packet data from the client device 10 via the first frequency band and transmit the received packet data to the uplink forwarding module UL2, such that the uplink forwarding module UL2 transmits the packet data to the wireless access device 30 via the second frequency band. Therefore, when the uplink forwarding module UL1 operating at the first frequency band has a poor connection quality and is not suitable for transmitting data, the wireless extender 20 can adjust the transmission path to the uplink forwarding module UL2, so as to avoid unusable transmission paths, avoid transmitting in congested frequency band, increase the spectrum utilization efficiency and improve the transmission efficiency.

In brief, for the packet data received from the client device 10 via the first frequency band by the local forwarding module LO1, the connection path selection module 200 dynamically determines that the packet data is transmitted to the wireless access device 30 via the uplink forwarding module UL1 operating at the first frequency band (i.e. straight forwarding mode) or via the uplink forwarding module UL2 operating at the second frequency band (i.e. crossband forwarding mode) according to related communication quality indicators. Therefore, the wireless extender of the invention can dynamically and immediately adjust transmission paths for transmitting the received packet data to the wireless access device, thus effectively improving the transmission efficiency.

The following further elaborates embodiments associated with the operation of the communication system 1 shown in FIG. 1. In an embodiment, please refer to FIG. 3. Assuming the local forwarding module LO1 and the uplink forwarding module UL1 operate at a frequency band of 5 GHz. The local forwarding module LO2 and the uplink forwarding module UL2 operate at a frequency band of 2.4 GHz. According to equation (1), the calculated first uplink throughput $TP_1$ corresponding to the uplink forwarding module UL1 is 200 Mbps. The calculated second uplink throughput $TP_2$ corresponding to the uplink forwarding module UL2 is 100 Mbps. The calculated first local throughput $TP_3$ corresponding to the local forwarding module LO1 is 50 Mbps. Moreover, according to equation (2), the straight throughput TP_S corresponding to the client device 10 would be:

TP_S=200 Mbps×50 Mbps/(200 Mbps+50 Mbps)
=40 Mbps

Figure 3:
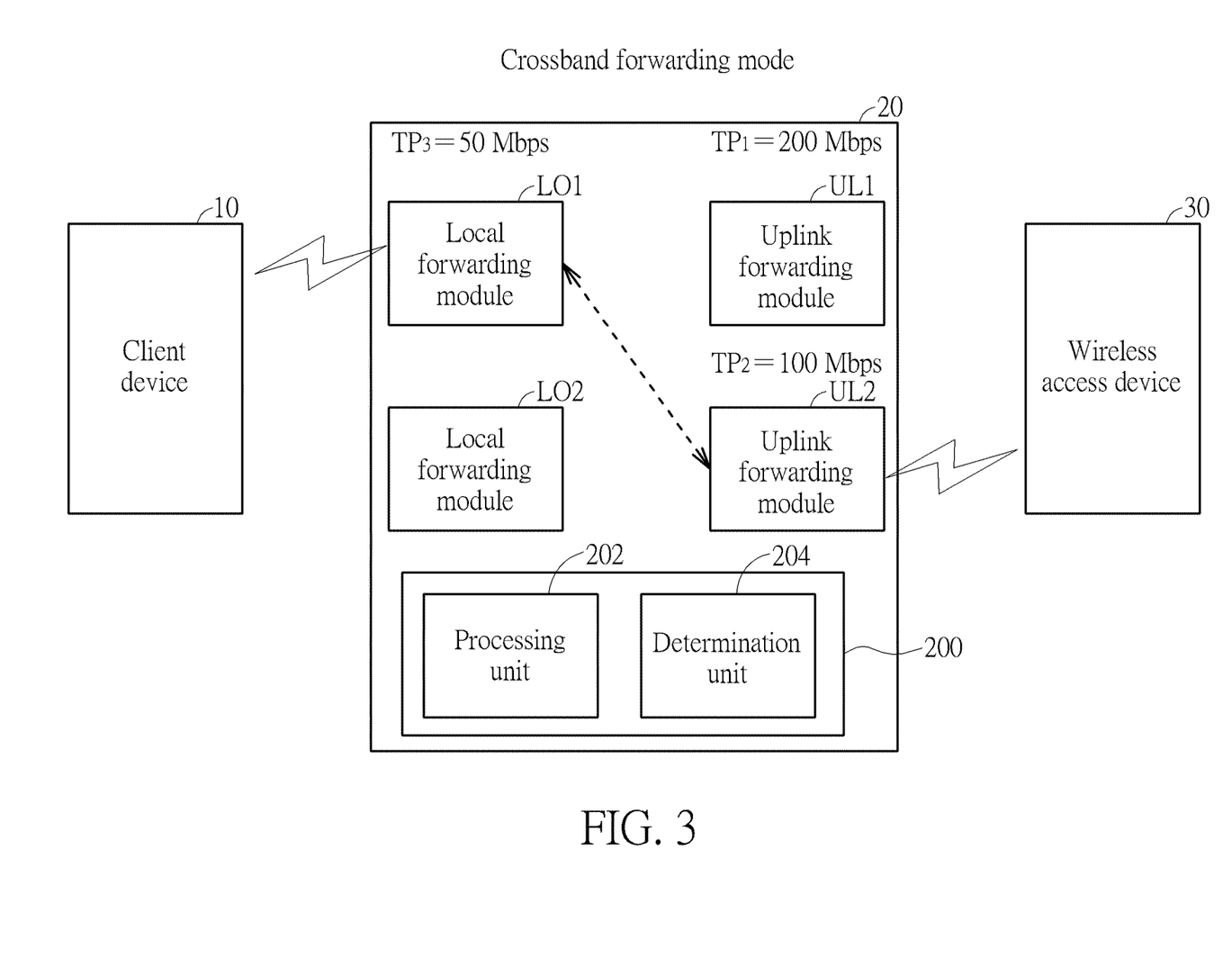
FIG. 3 and FIG. 4 are schematic diagrams of selecting connection path according to embodiments of the present invention respectively.

According to equation (3), the crossband throughput TP_C corresponding to the client device 10 would be:

TP_C=min(50 Mbps,100 Mbps)=50 Mbps

In such a situation, the straight throughput TP_S is smaller than the crossband throughput TP_C (i.e. TP_S=40 Mbps<TP_C=50 Mbps), the determination unit 204 may adopt the crossband forwarding mode and determine that the uplink forwarding module UL2 transmits the packet data received from the client device 10 to the wireless access device 30. Accordingly, after receiving packet data from the client device 10 via the first frequency band, the local forwarding module LO1 transmits the received packet data to the uplink forwarding module UL2. The uplink forwarding module UL2 transmits the packet data to the wireless access device 30 via the second frequency band.

Figure 4:
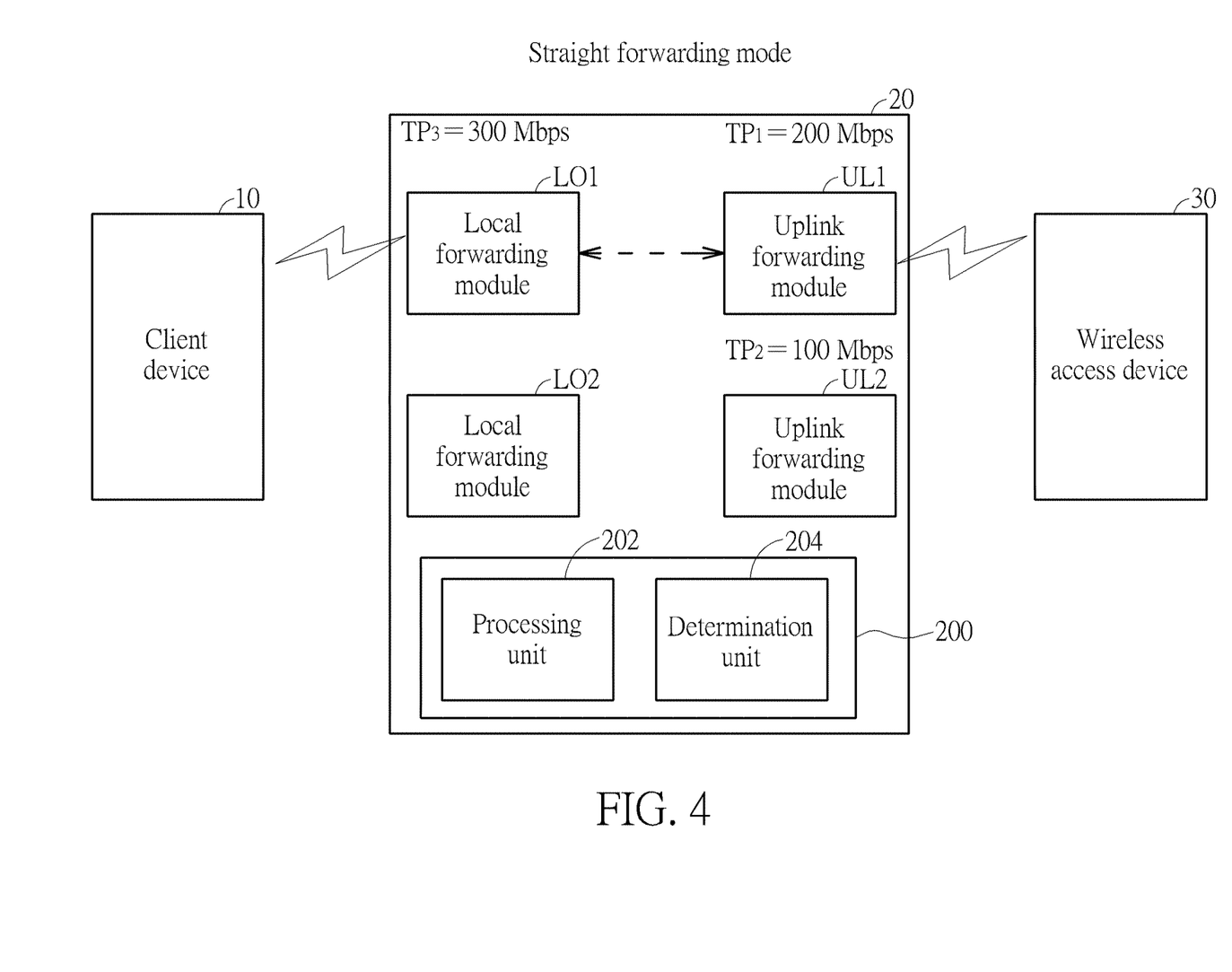

In an embodiment, please refer to FIG. 4. Assuming the local forwarding module LO1 and the uplink forwarding module UL1 operate at a frequency band of 5 GHz. The local forwarding module LO2 and the uplink forwarding module UL2 operate at a frequency band of 2.4 GHz. According to equation (1), the calculated first uplink throughput $TP_1$ corresponding to the uplink forwarding module UL1 is 200 Mbps. The calculated second uplink throughput $TP_2$ corresponding to the uplink forwarding module UL2 is 100 Mbps. The calculated first local throughput $TP_3$ corresponding to the local forwarding module LO1 is 300 Mbps. Moreover, according to equation (2), the straight throughput TP_S corresponding to the client device 10 would be:

$$TP\_S = 200 \text{ Mbps} \times 300 \text{ Mbps}/(200 \text{ Mbps}+300 \text{ Mbps})$$
$$= 120 \text{ Mbps}$$

According to equation (3), the crossband throughput TP_C corresponding to the client device 10 would be:

$$TP\_C = \min(300 \text{ Mbps}, 100 \text{ Mbps}) = 100 \text{ Mbps}$$

In such a situation, the straight throughput TP_S is greater than the crossband throughput TP_C (i.e. TP_S=120 Mbps>TP_C=100 Mbps), the determination unit 204 may adopt the straight forwarding mode and determine that the uplink forwarding module UL1 transmits the packet data received from the client device 10 to the wireless access device 30. Accordingly, after receiving packet data from the client device 10 via the first frequency band, the local forwarding module LO1 transmits the received packet data to the uplink forwarding module UL1. The uplink forwarding module UL1 transmits the packet data to the wireless access device 30 via the first frequency band.

In summary, for the packet data received from the client device 10 via the first frequency band by the local forwarding module LO1, the invention can dynamically determine that the packet data is transmitted to the wireless access device via the uplink forwarding module operating at the first frequency band (i.e. straight forwarding mode) or via the uplink forwarding module operating at the second frequency band (i.e. crossband forwarding mode) according to related communication quality indicators. Therefore, the invention can dynamically and immediately adjust transmission paths for transmitting the received packet data to the wireless access device, thus effectively improving the transmission efficiency.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A dynamic crossband link method for a wireless extender, comprising:
   utilizing a local forwarding module to receive packet data from a client device via a first frequency band;
   obtaining a first communication quality indicator corresponding to a first uplink forwarding module and a second communication quality indicator corresponding to a second uplink forwarding module and a communication quality indicator corresponding to the local forwarding module;
   calculating a straight throughput according to the first communication quality indicator and the local communication quality indicator;
   calculating a crossband throughput according to the second communication quality indicator and the local communication quality indicator;
   determining to transmit the packet data to a wireless access device via the first uplink forwarding module or via the second uplink forwarding module according to the straight throughput and the crossband throughput; and
   the wireless extender transmits the packet data to the wireless access device by the first uplink forwarding module or by the second uplink forwarding module.

2. The method of claim 1, wherein the first uplink forwarding module communicates with the wireless access device via the first frequency band and the second uplink forwarding module communicates with the wireless access device via a second frequency band.

3. The method of claim 1, wherein the step of determining to transmit the packet data to the wireless access device via the first uplink forwarding module or via the second uplink forwarding module according to the straight throughput and the crossband throughput comprises:
   calculating the straight throughput according to a first data rate corresponding to the first uplink forwarding module and a local data rate corresponding to the local forwarding module;
   calculating the crossband throughput according to a second data rate corresponding to the second uplink forwarding module and the local data rate; and
   determining to transmit the packet data received from the client device to the wireless access device via the first uplink forwarding module or via the second uplink forwarding module according to the straight throughput and the crossband throughput;
   wherein the first data rate is the data rate between the first uplink forwarding module and the wireless access device, the second data rate is the data rate between the second uplink forwarding module and the wireless access device, and the local data rate is the data rate between the local forwarding module and the client device.

4. The method of claim 3, wherein the step of calculating the straight throughput comprises:
   calculating a first uplink throughput according to the first data rate and a first packet error rate corresponding to the first uplink forwarding module;
   calculating a local throughput according to the local data rate and a local packet error rate corresponding to the local forwarding module; and
   calculating the straight throughput according to the first uplink throughput and the local throughput.

5. The method of claim 4, wherein the step of calculating the straight throughput determines the straight throughput according to the following equation:

$$TP\_S = TP_1 \times TP_3/(TP_1+TP_3)$$

where TP_S represents the straight throughput; $TP_1$ represents the first uplink throughput; and $TP_3$ represents the local throughput.

6. The method of claim 4, wherein the step of calculating the first uplink throughput and calculating the local throughput determine the first uplink throughput and the local throughput according to the following equations:

$$TP_1=R_1\times(1-PER_1);$$

$$TP_3=R_3\times(1-PER_3)$$

where $TP_1$ represents the first uplink throughput; $R_1$ represents the first data rate; $PER_1$ represents the first packet error rate; $TP_3$ represents the local throughput; $R_3$ represents the local data rate; and $PER_3$ represents the local error rate.

7. The method of claim 3, wherein the step of calculating the crossband throughput comprises:
calculating a second uplink throughput according to the second data rate and a second packet error rate corresponding to the second uplink forwarding module;
calculating a local throughput according to the local data rate and a local packet error rate corresponding to the local forwarding module; and
calculating the crossband throughput according to the second uplink throughput and the local throughput.

8. The method of claim 7, wherein the step of calculating the crossband throughput according to the second uplink throughput and the local throughput comprises:
comparing the second uplink throughput with the local throughput; and
selecting a minimum of the second uplink throughput and the local throughput as the crossband throughput.

9. The method of claim 7, wherein the step of calculating the second uplink throughput and calculating the local throughput determine the first uplink throughput and the local throughput according to the following equations:

$$TP_2=R_2\times(1-PER_2);$$

$$TP_3=R_3\times(1-PER_3)$$

where $TP_2$ represents the second uplink throughput; $R_2$ represents the second data rate; $PER_2$ represents the second packet error rate; $TP_3$ represents the local throughput; $R_3$ represents the local data rate; and $PER_3$ represents the local error rate.

10. The method of claim 3, wherein the step of determining to transmit the packet data to the wireless access device via the first uplink forwarding module or via the second uplink forwarding module according to the straight throughput and the crossband throughput comprises:
when the straight throughput is greater than the crossband throughput, determining to transmit the packet data received from the client device to the wireless access device via the first uplink forwarding module; and
when the straight throughput is smaller than or equal to the crossband throughput, determining to transmit the packet data received from the client device to the wireless access device via the second uplink forwarding module.

11. The method of claim 1, wherein the first communication quality indicator and the second communication quality indicator respectively comprise at least one of a data rate, a packet error rate, a wireless link quality, received signal strength indication, a resend rate, transmit queued time, a signal to noise ratio.

12. A wireless extender, applied between a wireless access device and a client device, comprising:
a processor unit coupled to a memory, wherein the memory stores a local forwarding module, a first uplink forwarding module, a second uplink forwarding module, and a connection path selection module, wherein:
a local forwarding module, for receiving packet data from the client device via a first frequency band;
a first uplink forwarding module, for communicating with the wireless access device via the first frequency band;
a second uplink forwarding module, for communicating with the wireless access device via a second frequency band; and
a connection path selection module, comprising:
the processing unit, for obtaining a first communication quality indicator corresponding to the first uplink forwarding module and a second communication quality indicator corresponding to the second uplink forwarding module and a communication quality indicator corresponding to the local forwarding module, calculating a straight throughput according to the first communication quality indicator and the local communication quality indicator, and calculating a crossband throughput according to the second communication quality indicator and the local communication quality indicator;
a determination unit, for determining to transmit the packet data to the wireless access device via the first uplink forwarding module or via the second uplink forwarding module according to the straight throughput and the crossband throughput; and
transmitting the packet data to the wireless access device by the first uplink forwarding module or by the second uplink forwarding module.

13. The wireless extender of claim 12, wherein the processing unit calculates the straight throughput according to a first data rate corresponding to the first uplink forwarding module and a local data rate corresponding to the local forwarding module, the processing unit calculates the crossband throughput according to a second data rate corresponding to the second uplink forwarding module and the local data rate, and the determination unit determines to transmit the packet data received from the client device to the wireless access device via the first uplink forwarding module or via the second uplink forwarding module according to the straight throughput and the crossband throughput, wherein the first data rate is the data rate between the first uplink forwarding module and the wireless access device, the second data rate is the data rate between the second uplink forwarding module and the wireless access device, and the local data rate is the data rate between the local forwarding module and the client device.

14. The wireless extender of claim 13, wherein the processing unit calculates a first uplink throughput according to the first data rate and a first packet error rate corresponding to the first uplink forwarding module, calculates a local throughput according to the local data rate and a local packet error rate corresponding to the local forwarding module, and calculates the straight throughput according to the first uplink throughput and the local throughput.

15. The wireless extender of claim 14, wherein the straight throughput is calculated by the processing unit according to the following equation:

$$TP\_S=TP_1\times TP_3/(TP_1+TP_3)$$

where $TP\_S$ represents the straight throughput; $TP_1$ represents the first uplink throughput; and $TP_3$ represents the local throughput.

16. The wireless extender of claim 14, wherein the first uplink throughput and the local throughput are calculated by the processing unit according to the following equations:

$TP_1=R_1\times(1-PER)$;

$TP_3=R_3\times(1-PER_3)$ where $TP_1$ represents the first uplink throughput; $R_1$ represents the first data rate; $PER_1$ represents the first packet error rate; $TP_3$ represents the local throughput; $R_3$ represents the local data rate; and $PER_3$ represents the local error rate.

17. The wireless extender of claim 13, wherein the processing unit calculates a second uplink throughput according to the second data rate and a second packet error rate corresponding to the second uplink forwarding module, calculates a local throughput according to the local data rate and a local packet error rate corresponding to the local forwarding module, and calculates the crossband throughput according to the second uplink throughput and the local throughput.

18. The wireless extender of claim 17, wherein the processing unit compares the second uplink throughput with the local throughput and selects a minimum of the second uplink throughput and the local throughput as the crossband throughput.

19. The wireless extender of claim 17, wherein the second uplink throughput and the local throughput are calculated by the processing unit according to the following equations:

$TP_2=R_2\times(1-PER_2)$;

$TP_3=R_3\times(1-PER_3)$ where $TP_2$ represents the second uplink throughput; $R_2$ represents the second data rate; $PER_2$ represents the second packet error rate; $TP_3$ represents the local throughput; $R_3$ represents the local data rate; and $PER_3$ represents the local error rate.

20. The wireless extender of claim 13, wherein when the straight throughput is greater than the crossband throughput, the determination unit determines to transmit the packet data to the wireless access device via the first uplink forwarding module, and when the straight throughput is smaller than or equal to the crossband throughput, the determination unit determines to transmit the packet data to the wireless access device via the second uplink forwarding module.

21. The wireless extender of claim 12, wherein the first communication quality indicator and the second communication quality indicator respectively comprise at least one of a data rate, a packet error rate, a wireless link quality, received signal strength indication, a resend rate, transmit queued time, a signal to noise ratio.

* * * * *